UNITED STATES PATENT OFFICE.

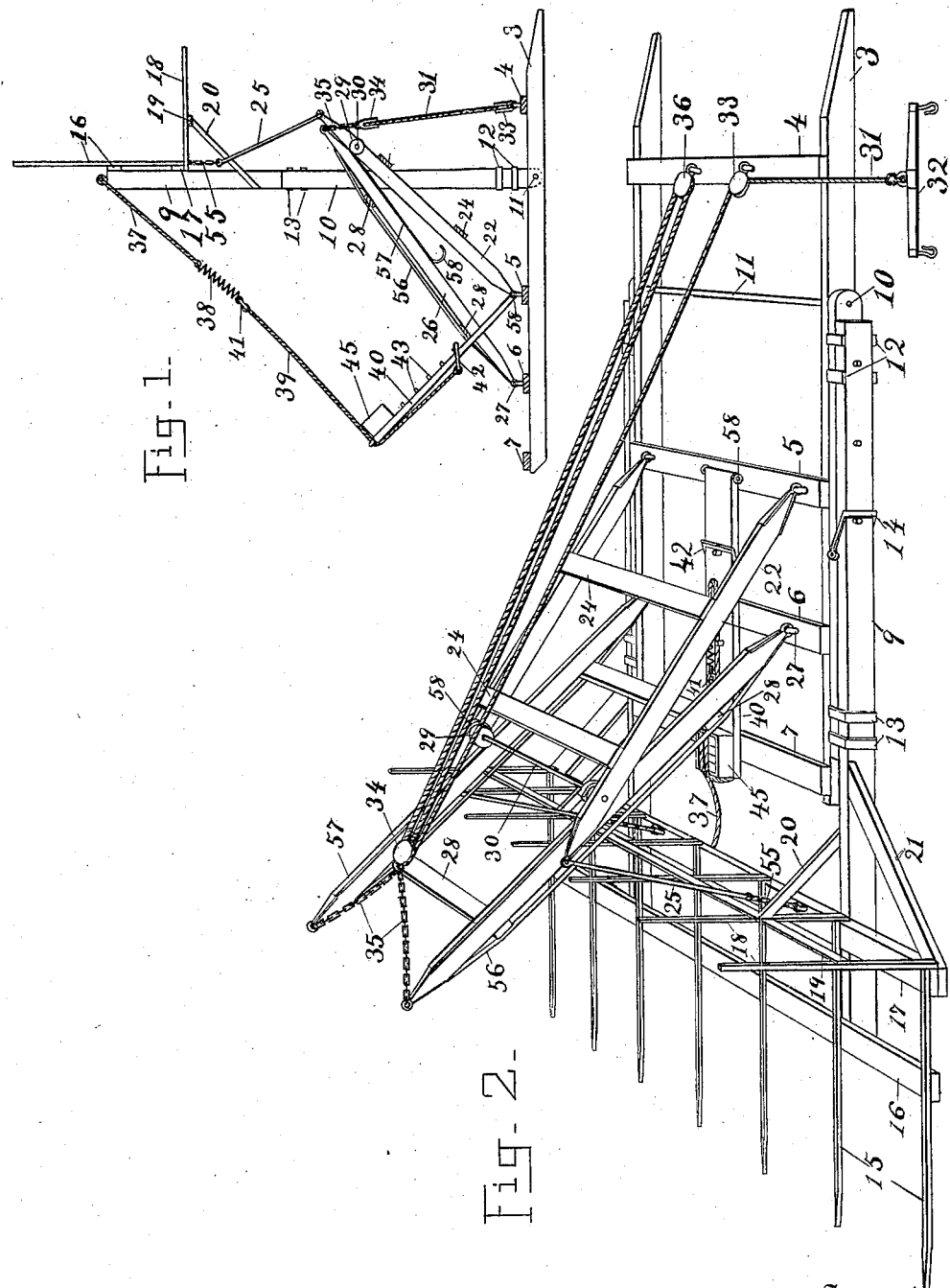

ALLISON F. SNYDER, OF BAYARD, NEBRASKA, ASSIGNOR OF ONE-HALF TO JACOB L. DETRICK.

HAY LOADER AND STACKER.

963,332.   Specification of Letters Patent.   Patented July 5, 1910.

Application filed June 25, 1909. Serial No. 504,394.

*To all whom it may concern:*

Be it known that I, ALLISON F. SNYDER, a citizen of the United States, residing at Bayard, in the county of Morrill and State of Nebraska, have invented certain new and useful Improvements in Hay Loaders and Stackers, of which the following is a specification.

This invention relates to that class of farming implements which are used for loading and stacking hay, and its object is to provide means whereby a horse traveling on the ground and pulling at a rope may raise the hay from the ground and throw it upon a stack or onto a wagon.

To this end my invention consists in the construction and combination of parts forming a hay loader and stacker hereinafter more fully described and particularly stated in the claims, reference being had to the accompanying drawings in which—

Figure 1 represents in longitudinal, vertical section, on a plane this side of center, a hay loader and stacker according to my invention. Fig. 2 shows a perspective view of the same.

Numeral 3 represents the sides, and 4, 5, 6 and 7, the crossbars of the body or sled which slides or rests upon the ground. The two sidebars 9, of the fork, are connected to the sled by means of extension bars 10, which are pivoted to the sides 3, on a cross rod 11, to be swung up and down. The sidebars 9, are fitted to slide longitudinally upon the extension bars 10, by means of straps 12, secured firmly to bars 9, and passing around the bars 10, to slide thereon; and straps 13, are secured to the bars 10, and pass freely around bars 9, permitting the latter to slide through them. A loop 14, is adapted to hold the bars 9, either in their normal position, as shown, or as extended for a higher lift. The teeth 15, of the fork, are rigidly secured to the sides by means of two crossbars 16, 17. To the head bar 17, a number of fingers 18, are secured, and a crossbar 19, attached to them and connected with the sides 9, by braces 20, holds the head fingers rigidly in place.

A pair of side braces 21, connecting the extended ends of the head bar 17, with the sidebars 9, stiffen the fork against lateral strain. A derrick comprising two side booms 22, hung by strong hinges 23, to the crossbar 5, and provided with stiffening crossbars 24, is connected with the fork head bar 17, by means of rods 25, and chains 55. A pair of intermediate levers 26, are hung by hinges 27, to the crossbar 6, and are formed into a stiff frame by crossbars 28, and each lever is stiffened by a truss rod 56. Rollers 29, are mounted on the derrick booms 22, by means of a shaft 30. Rails 57, of stiff strap iron, are fixed upon the levers 26, for the rollers 29, to travel upon; and these straps are bent into hooks 58, for the rollers to rest in at the end of their backward movement, thus locking the derrick 22, and the levers 26, standing in a slanting position ready for the next lift.

The draft rope 31, to which the horse is to be hitched by a swingletree 32, runs through a pulleyblock 33, that is hung to the crossbar 4, and passes thence through a pulleyblock 34, that is connected with the levers 26, by means of a bail chain 35, thence through another pulleyblock 36, that is hung to the crossbar 4. The rope 31, is attached at its end to the block 34. A return stay comprising a bail rope 37, spring 38, a ring eye 41, a tail rope 39, and a weighted arm 40, is attached by the ends of the bail 37, to the rear or under side of the fork. One of the springs 38, forms part of each arm of the bail and connects the ropes 37, with the ring 41, and that ring is attached to the tail rope 39. The arm 40, is hinged at 58, to the crossbar 5, to swing up and down, and is provided with a stirrup 42, which encircles the arm 40, to engage any one of a series of stop pins 43.

In operation, the fork, while resting on the ground, as in Fig. 2, is to be loaded with hay. Then the horse, being started, pulls the rope 31, raising the levers 26, which, bearing on rollers 29, swing forward the booms 22, which, by means of rods 25, and chains 55, raise the fork and its load. The load offers most resistance at first starting. To meet this, the levers 26, begin their action when the rollers 29, are starting from their resting hooks 58, low down on the levers and nearest to their fulcrum, the hinges 27; and as the load rises its resistance lessens rapidly on approaching the vertical position over the turning point of the fork, and in about the same proportion the lifting leverage lessens as the rollers 29, travel toward the outer ends of the levers 26. Therefore, while the horse travels at an even speed and with very nearly a continuously even pull the load travels faster and faster until the fork reaches a vertical position, as shown in Fig. 1. At this time the recoil stay being straightened out, has lifted the arm 40, and its weight 45, until the arm is stopped by the lower crossbar 28, which is across its path. The momentum of the load carries the fork over beyond center, and when the springs 38, are stretched to their limit the fork is suddenly stopped, leaving the load to be dumped by its own momentum. By setting the stirrup 42, farther out on arm 40, the tail rope 39, will be lengthened and the fork may thus be permitted to swing so far over that the lightest load will slide off. The return force of the springs 38, gives a quick rise to fingers 18, thus tending to kick the last bit of the load onto the stack or wagon. Now, the return of the fork past dead center and through its upper arc, against the resistance of the rope 31, is accomplished by the arm 40, and its weight 45, sinking down to rest. After this the fork is so far returned from the balancing point that it descends rapidly to its resting position. The length of the arm 40, is so proportioned as to fold up the connection 39, and the bail 37, when the fork descends, keeping them from dragging on the ground or becoming entangled with other parts of the machine. By this method of concentrating power at the starting of the load and quickening the speed of the fork as its resistance becomes less, there is no severe strain on the horse at any time, and each load is quickly delivered to the desired spot.

The machine is very strong and simple in construction and relatively inexpensive.

Having thus fully described my invention, what I believe to be new and desire to secure by Letters Patent is stated in the following claims.

1. In a hay loader and stacker, a fork hinged upon a body portion to swing up and past center; derrick booms hinged at one end to the body and connected at the other end with the fork, rollers mounted upon the derrick booms at a fixed distance from their hinges; a pair of levers hinged at one end to the said body and mounted to travel on the said rollers; a draft rope connected with the levers, and pulleyblocks for guiding the rope.

2. In a hay loader and stacker, a fork, and a lifting device therefor comprising derrick booms hinged at one end to a support, connected at the other end with the fork and carrying a pair of rollers at a fixed distance from their hinge ends; a pair of levers hung at one end to the said support to travel on the said rollers, and means for operating these levers substantially as shown and described.

3. In a hay loader and stacker, a body; a fork hinged to swing upward therefrom; a derrick hinged at one end to the body and connected at the other end with the fork; rollers mounted on the derrick; a lever hinged at one end to the frame and means at the other end to connect it with a team, and rails located upon the said lever to travel upon the said rollers and provided with resting hooks for the rollers.

4. In a hay loader and stacker, a frame; a fork; a derrick hinged at one end to the frame and connected with the fork, and carrying rollers; and levers hinged at one end to the frame and having at the other end connections for attaching a team, and traveling midway upon said rollers, and having resting hooks therefor.

5. In a hay loader and stacker, a frame; a fork hung thereon to be swung upward and past center and means for swinging it; a retracting stay comprising a weighted arm and spring connections between the arm and fork, and a stop bar located in the path of the said arm, substantially as shown and described.

In testimony whereof I affix my signature in presence of two witnesses.

ALLISON F. SNYDER.

Witnesses:
R. H. WALFORD,
ROY WALFORD.